United States Patent
Fang

(10) Patent No.: US 8,837,175 B2
(45) Date of Patent: *Sep. 16, 2014

(54) SYSTEMS AND METHODS FOR ADAPTIVE SWITCHING FREQUENCY CONTROL IN SWITCHING-MODE POWER CONVERSION SYSTEMS

(75) Inventor: Lieyi Fang, Shanghai (CN)

(73) Assignee: On-Bright Electronics (Shanghai) Co., Ltd., Shanghai (CN)

(*) Notice: Subject to any disclaimer, the term of this patent is extended or adjusted under 35 U.S.C. 154(b) by 37 days.

This patent is subject to a terminal disclaimer.

(21) Appl. No.: 13/528,494

(22) Filed: Jun. 20, 2012

(65) Prior Publication Data

US 2012/0257423 A1    Oct. 11, 2012

Related U.S. Application Data

(63) Continuation of application No. 12/510,121, filed on Jul. 27, 2009, now Pat. No. 8,228,692.

(60) Provisional application No. 61/084,538, filed on Jul. 29, 2008.

(51) Int. Cl.
    *H02M 3/335*    (2006.01)

(52) U.S. Cl.
    USPC ....................................... 363/21.15

(58) Field of Classification Search
    USPC ................ 363/21.02–21.03, 21.08–21.18, 97
    See application file for complete search history.

(56) References Cited

U.S. PATENT DOCUMENTS

| | | | | |
|---|---|---|---|---|
| 4,353,112 A | * | 10/1982 | Rietveld et al. | 363/97 |
| 6,101,111 A | * | 8/2000 | Blair | 363/97 |
| 8,228,692 B2 | * | 7/2012 | Fang | 363/21.15 |

* cited by examiner

*Primary Examiner* — Jue Zhang
(74) *Attorney, Agent, or Firm* — Jones Day

(57) ABSTRACT

Switching-mode power conversion system and method thereof. The system includes a primary winding configured to receive an input voltage and a secondary winding coupled to the primary winding. Additionally, the system includes a compensation component configured to receive the input voltage and generate at least a clock signal based on at least information associated with the input voltage, and a signal generator configured to receive at least the clock signal and generate at least a control signal based on at least information associated with the clock signal. Moreover, the system includes a gate driver configured to receive at least the control signal and generate a drive signal based on at least information associated with the control signal, and a first switch configured to receive the drive signal and affect a first current flowing through the primary winding.

29 Claims, 9 Drawing Sheets

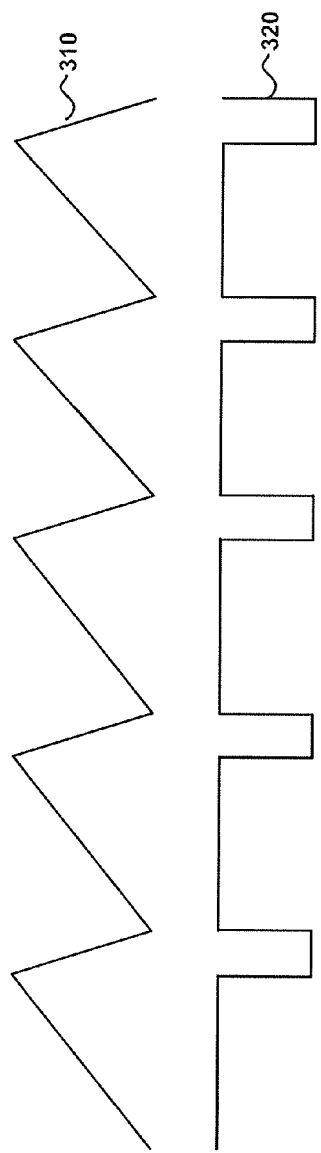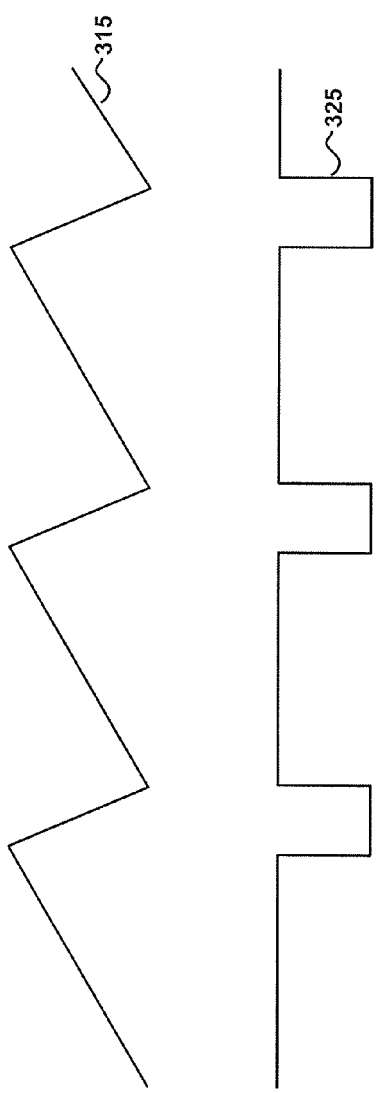
Figure 4(A)
Figure 4(B)

SYSTEMS AND METHODS FOR ADAPTIVE SWITCHING FREQUENCY CONTROL IN SWITCHING-MODE POWER CONVERSION SYSTEMS

1. CROSS-REFERENCES TO RELATED APPLICATIONS

This application is a continuation of U.S. patent application Ser. No. 12/510,021, filed Jul. 27, 2009, which claims priority to U.S. Provisional No. 61/084,538, filed Jul. 29, 2008, both applications being commonly assigned and incorporated by reference herein for all purposes.

2. BACKGROUND OF THE INVENTION

The present invention is directed to switching-mode power conversion systems. More particularly, the invention provides systems and methods for adaptive switching frequency control. Merely by way of example, the invention has been applied to off-line switching-mode flyback power conversion systems. But it would be recognized that the invention has a much broader range of applicability.

To meet certain international power conservation requirements, power supplies need to have very low levels of standby power consumption. For example, the averaged power efficiency should be high at 25%, 50%, 75%, and 100% load conditions. In switching-mode power conversion systems, power loss mainly results from the switching loss of the power switches, the conduction loss of the power switches, the core loss of the transformer and inductors, and the power loss of the snubbers. All of these types of power losses are proportional to the switching frequency. Additionally, the core loss of the transformer and inductors and the power loss of the snubbers also depend on the material used.

FIG. 1 is a simplified diagram showing a conventional flyback switching-mode power conversion system with fixed switching frequency. The flyback switching-mode power conversion system 100 includes an oscillator 110, a current generator 120, and a pulse-width-modulation (PWM) generator 130. The switching frequency of the PWM generator 130 is determined by the oscillator 110. For example, the oscillator 110 receives a predetermined constant current from the current generator 120. Hence the switching frequency is constant regardless of the input AC line voltage (i.e., VAC). The input AC line voltage is also called the line voltage.

FIG. 2 is a simplified diagram showing the conventional oscillator 110 in the conventional power conversion system 100. The oscillator 110 includes a charge current source $I_C$ and a discharge current source $I_D$, which alternatively change the voltage of $C_O$ through switches SH and SL. Additionally, the oscillator 110 includes a RS flip-flop formed by NAND1 and NAND2 for latching switching states. Moreover, the oscillator 110 includes two voltage clamping comparators A1 and A2 with threshold voltages $V_H$ and $V_L$ respectively.

As shown in FIG. 2, the oscillator 110 outputs a ramping signal and a clock signal to the PWM generator 130. The oscillating amplitude of the ramping signal and the clock signal is equal to the difference between $V_H$ and $V_L$. Also, the switching frequency $f_{SW}$ of the PWM generator 130 is determined as follows:

$$f_{SW} = \frac{1}{T_{ON} + T_{OFF}} \quad (1)$$

where $$T_{ON} = \frac{(V_H - V_L) \times C_O}{I_C} \quad (2)$$

$$T_{OFF} = \frac{(V_H - V_L) \times C_O}{I_D} \quad (3)$$

Hence, the switching frequency $f_{SW}$ depends on $I_C$ and $O_D$.

Referring to FIG. 1, for low power applications, the power loss due to switching loss and the conduction loss due to one or more power switches depend on the line voltage. For example, in a given rated power converter, the switching loss dominates for high line voltages while the conduction loss dominates for low line voltages.

Specifically, the switching loss $P_{SW}$ often is given by $$P_{sw} = \frac{1}{2} f_{SW} \cdot (V_{IN})^2 \cdot (C_{DS} + C_{DG}) \circ \frac{1}{2} f_{SW} \cdot V_{IN} \cdot I_{PK}(t_{SW\_ON} + t_{SW\_OFF}) \quad (4)$$

where $f_{sw}$ is the switching frequency, and $V_{IN}$ is an input voltage for the primary winding. As shown in FIG. 1, the input voltage $V_{IN}$ is the rectified line voltage. Additionally, $C_{DS}$ and $C_{DG}$ are the parasitic capacitance associated with the power switch. Moreover, $I_{PK}$ is the peak current for the primary winding at the switching transient, and $t_{SW\_ON}$ and $t_{SW\_OFF}$ are the switching transient times.

According to Equation 4, for a given power switch such as MOSFET, the switching loss increases with the input voltage as a quadratic function. Hence, lowering the switching frequency can reduce the switching loss, especially for high input voltages.

In another example, the conduction loss $P_{cond}$ is $$P_{cond} = \frac{1}{T_{SW}} \int_0^{t_{on}} i_L^2(t)\, dt \cdot R = (I_{PK}^2 - I_{PK}^2(0)) \cdot R \cdot t_{on} \cdot f_{SW} \quad (5)$$

where $I_{PK}$ is the peak current that the switch conducts at the end of the switch-on period, and $I_{PK}(0)$ is the current that the switch conducts at the beginning of the switch-on period. Additionally, R is the on-resistance of the switch, $t_{on}$ is the conduction period, and $f_{sw}$ is the switching frequency. The product of $t_{on} \cdot f_{SW}$ is called duty cycle. For a given output power and a given switching frequency, a lower input voltage can result in larger duty cycle thus higher conduction loss.

Moreover, for the flyback power conversion system 100, the power P delivered to the output is, for example, $$P = \frac{1}{2} f_{SW} \cdot L \cdot (I_{PK}^2 - I_{PK}^2(0)) \quad (6)$$

and $$I_{PK} - I_{PK}(0) = \frac{V_{IN}}{L} \cdot t_{on} \quad (7)$$

where L is the inductance of the primary winding, and $V_{IN}$ is an input voltage for the primary winding. For example, the input voltage $V_{IN}$ is the rectified line voltage. For a given output power P, increasing the switching frequency $f_{sw}$ can result in decreasing magnitude for $(I_{PK}^2 - I_{PK}^2(0))$, thus lower conduction loss according to Equation 5.

Therefore, it is highly desirable to improve techniques related to conversion efficiency of a power conversion system.

3. BRIEF SUMMARY OF THE INVENTION

The present invention is directed to switching-mode power conversion systems. More particularly, the invention provides systems and methods for adaptive switching frequency control. Merely by way of example, the invention has been applied to off-line switching-mode flyback power conversion systems. But it would be recognized that the invention has a much broader range of applicability.

According to one embodiment of the present invention, a switching-mode power conversion system includes a primary winding configured to receive an input voltage and a secondary winding coupled to the primary winding. Additionally, the system includes a compensation component configured to receive the input voltage and generate at least a clock signal based on at least information associated with the input voltage, and a signal generator configured to receive at least the clock signal and generate at least a control signal based on at least information associated with the clock signal. Moreover, the system includes a gate driver configured to receive at least the control signal and generate a drive signal based on at least information associated with the control signal, and a first switch configured to receive the drive signal and affect a first current flowing through the primary winding. The drive signal is associated with a switching frequency, and the switching frequency varies with the input voltage in magnitude.

According to another embodiment of the present invention, a switching-mode power conversion system includes a primary winding configured to receive an input voltage, and a secondary winding coupled to the primary winding. Additionally, the system includes a compensation component including a voltage sensing component, a current generator and an oscillator, and the oscillator is coupled to the current generator. The compensation component is configured to receive the input voltage and generate at least a clock signal based on at least information associated with the input voltage. Moreover, the system includes a signal generator configured to receive at least the clock signal and generate at least a control signal based on at least information associated with the clock signal, and a gate driver configured to receive at least the control signal and generate a drive signal based on at least information associated with the control signal. Also, the system includes a first switch configured to receive the drive signal and affect a first current flowing through the primary winding. The voltage sensing component is configured to receive the input voltage and generate a detected voltage based on at least information associated with the input voltage, and the current generator is configured to receive the detected voltage and generate a second current and a third current based on at least information associated with the detected voltage. Each of the second current and the third current varies with the input voltage in magnitude. Also, the control signal is associated with a switching frequency, and the switching frequency decreases with the increasing input voltage in magnitude.

According to yet another embodiment of the present invention, a method for regulating a switching frequency for a switching-mode power conversion system includes receiving an input voltage by a primary winding and by a compensation component. The compensation component includes a voltage sensing component, a current generator and an oscillator, the oscillator coupled to the current generator. Additionally, the method includes generating at least a clock signal based on at least information associated with the input voltage, receiving at least the clock signal by a signal generator, generating at least a control signal based on at least information associated with the clock signal, and receiving at least the control signal by a gate driver. Moreover, the method includes generating a drive signal based on at least information associated with the control signal, receiving the drive signal by a first switch, and affecting a first current flowing through the primary winding. The process for generating at least a clock signal includes receiving the input voltage by the voltage sensing component, generating a detected voltage based on at least information associated with the input voltage, receiving the detected voltage by the current generator, and generating a second current and a third current based on at least information associated with the detected voltage. Also, each of the second current and the third current varies with the input voltage in magnitude. The control signal is associated with a switching frequency, and the switching frequency decreases with the increasing input voltage in magnitude.

Many benefits are achieved by way of the present invention over conventional techniques. Certain embodiments of the present invention provide adaptive line-voltage compensated switching frequency control. Some embodiments of the present invention use the line voltage to modulate the switching frequency. For example, a high line voltage results in low switching frequency, and a low line voltage results in high switching frequency. Certain embodiments of the present invention provide switching frequency control methods to reduce power loss in switching-mode power conversion systems including but not limited to off-line power supplies. Some embodiments of the present invention can improve conversion efficiency for both low and high line voltages.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

FIGS. 4(A) and (B) are simplified diagrams showing waveforms of the clock signal and the ramp signal for the switching-mode power conversion system with input-voltage-compensated switching frequency according to certain embodiments of the present invention.

Figure 5:
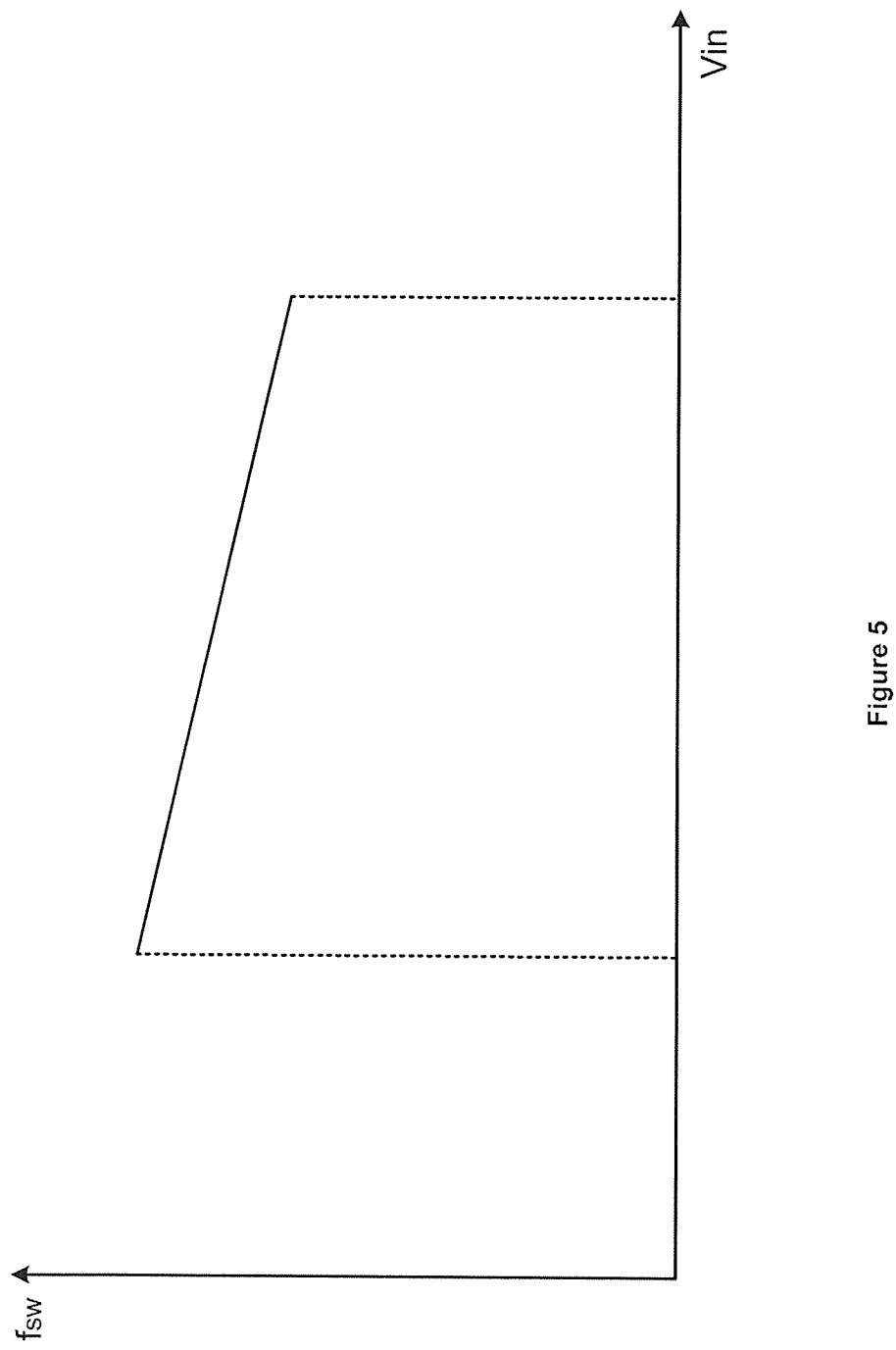

FIG. 5 is a simplified diagram showing the switching frequency as a function of input voltage $V_{in}$ for the switching-mode power conversion system according to an embodiment of the present invention.

Figure 6:
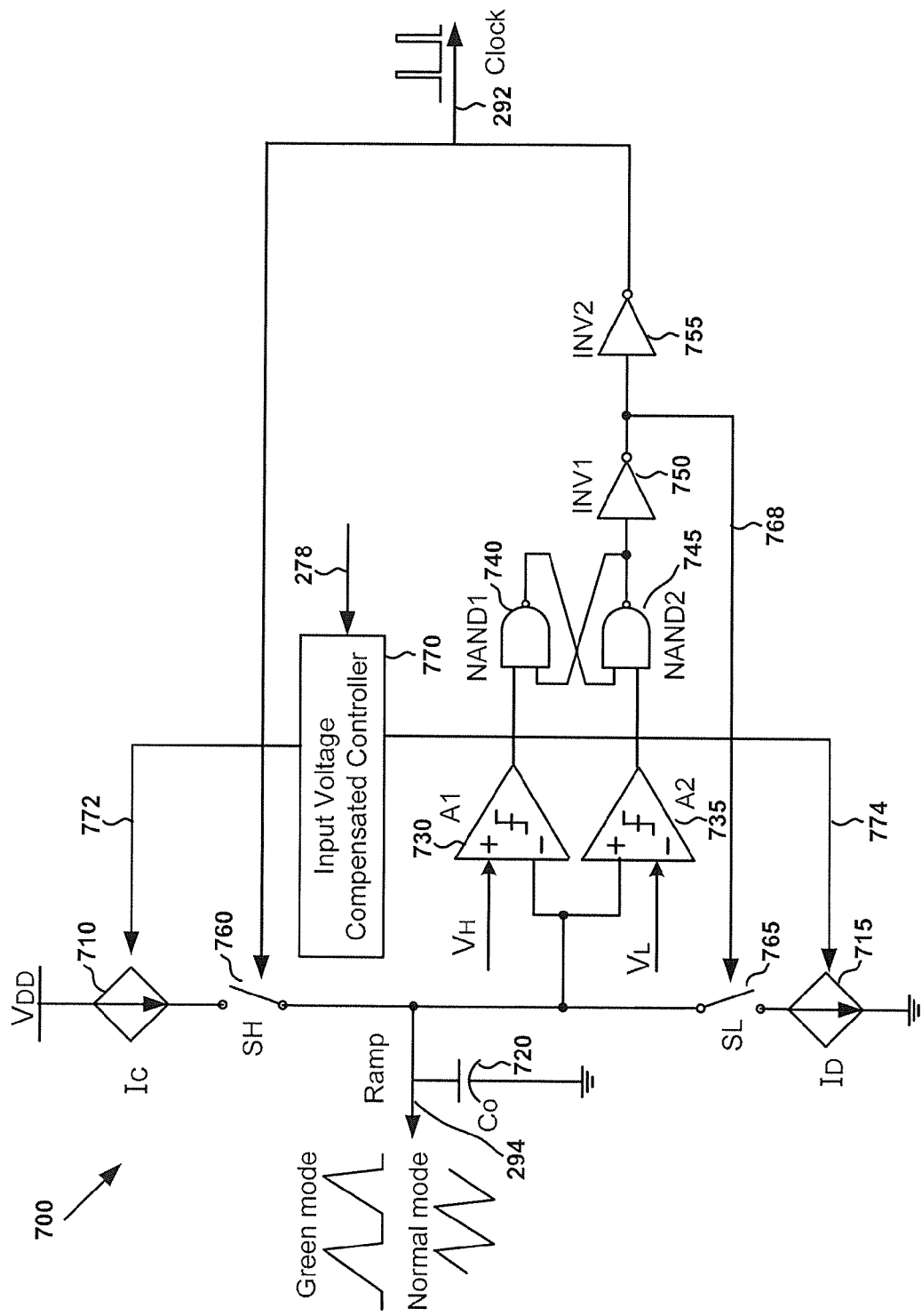

FIG. 6 is a simplified diagram showing a combination of the input-voltage-compensated current generator and the oscillator in the switching-mode power conversion system according to an embodiment of the present invention.

Figure 7:
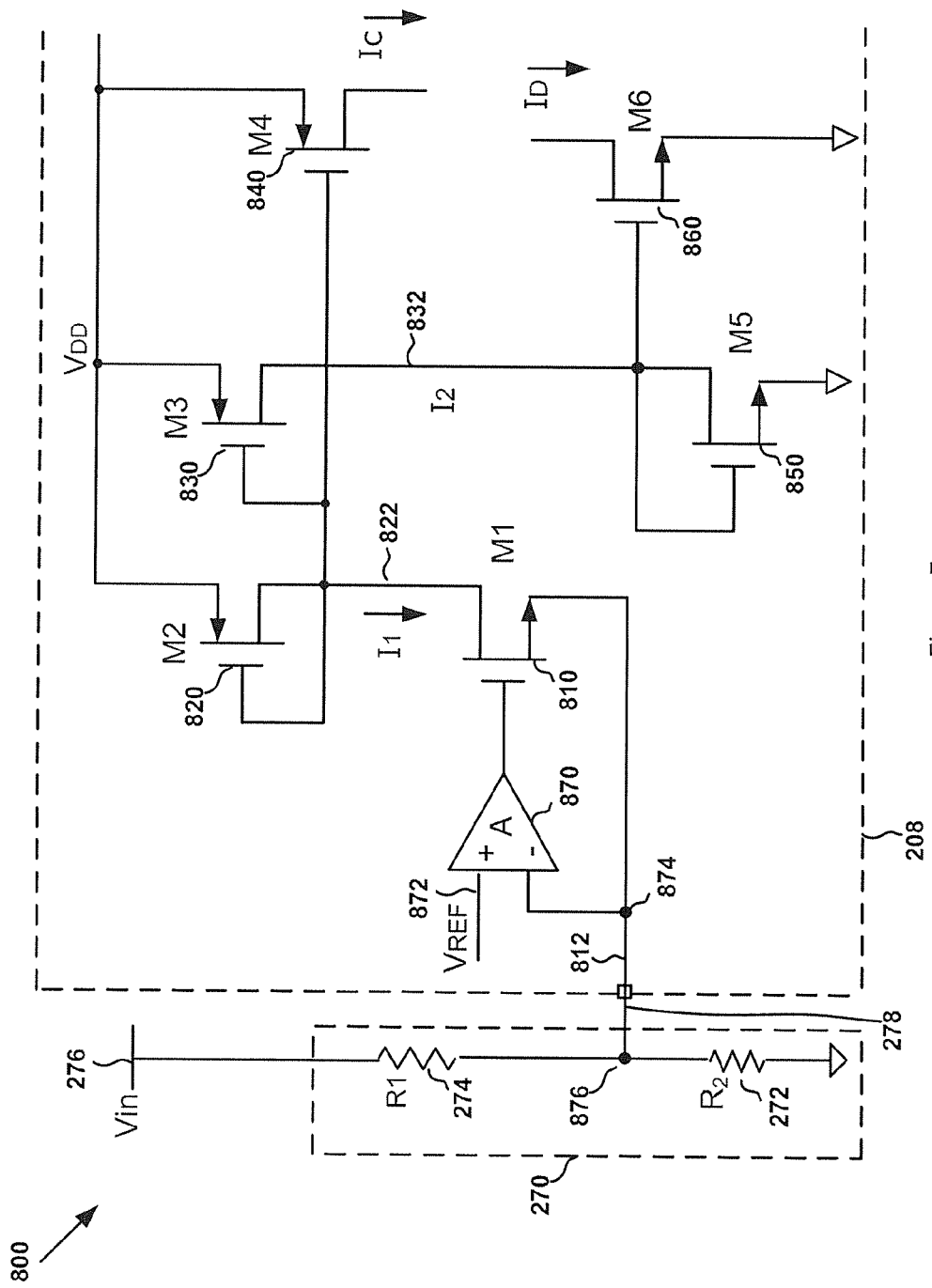

FIG. 7 is a simplified diagram showing a combination of the input-voltage sensing component, the input-voltage-compensated controller, and the current sources in the switching-mode power conversion system according to an embodiment of the present invention.

Figure 8:
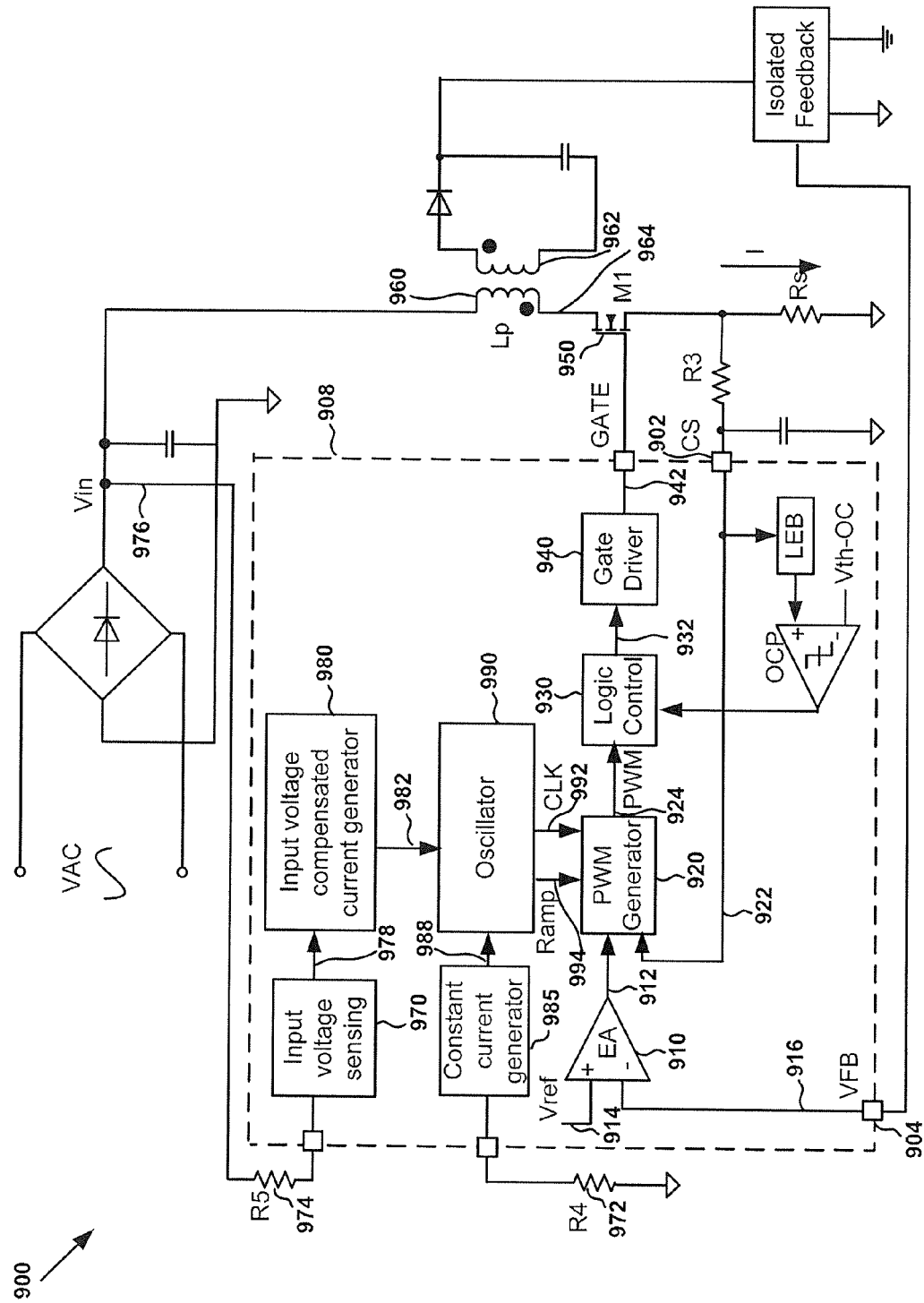

FIG. 8 is a simplified diagram showing a switching-mode power conversion system with input-voltage-compensated switching frequency according to another embodiment of the present invention.

Figure 9:
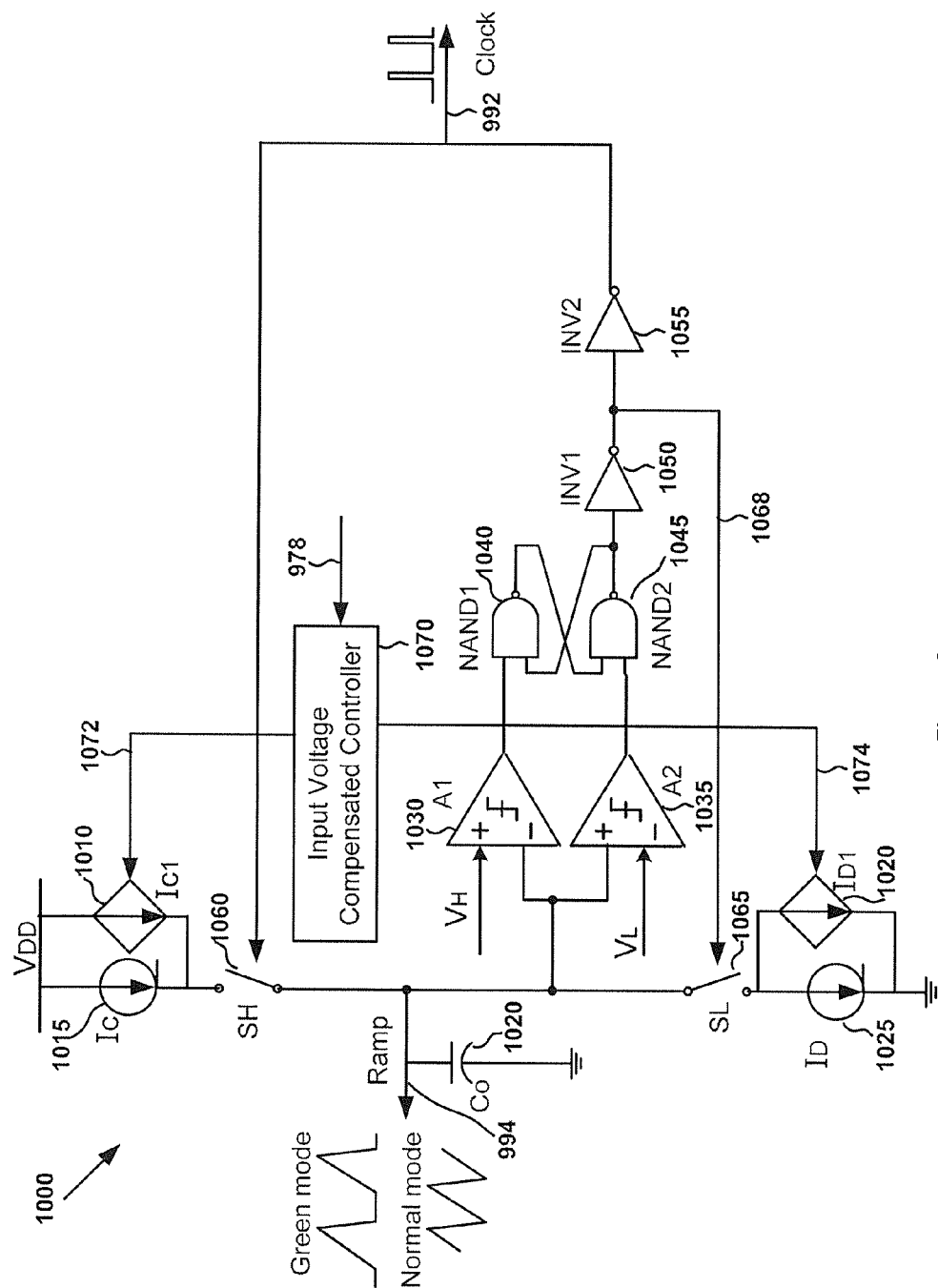

FIG. 9 is a simplified diagram showing a combination of the input-voltage-compensated current generator, the constant current generator, and the oscillator in the switching-mode power conversion system according to an embodiment of the present invention.

5. DETAILED DESCRIPTION OF THE INVENTION

The present invention is directed to switching-mode power conversion systems. More particularly, the invention provides systems and methods for adaptive switching frequency control. Merely by way of example, the invention has been applied to off-line switching-mode flyback power conversion systems. But it would be recognized that the invention has a much broader range of applicability.

Figure 3:
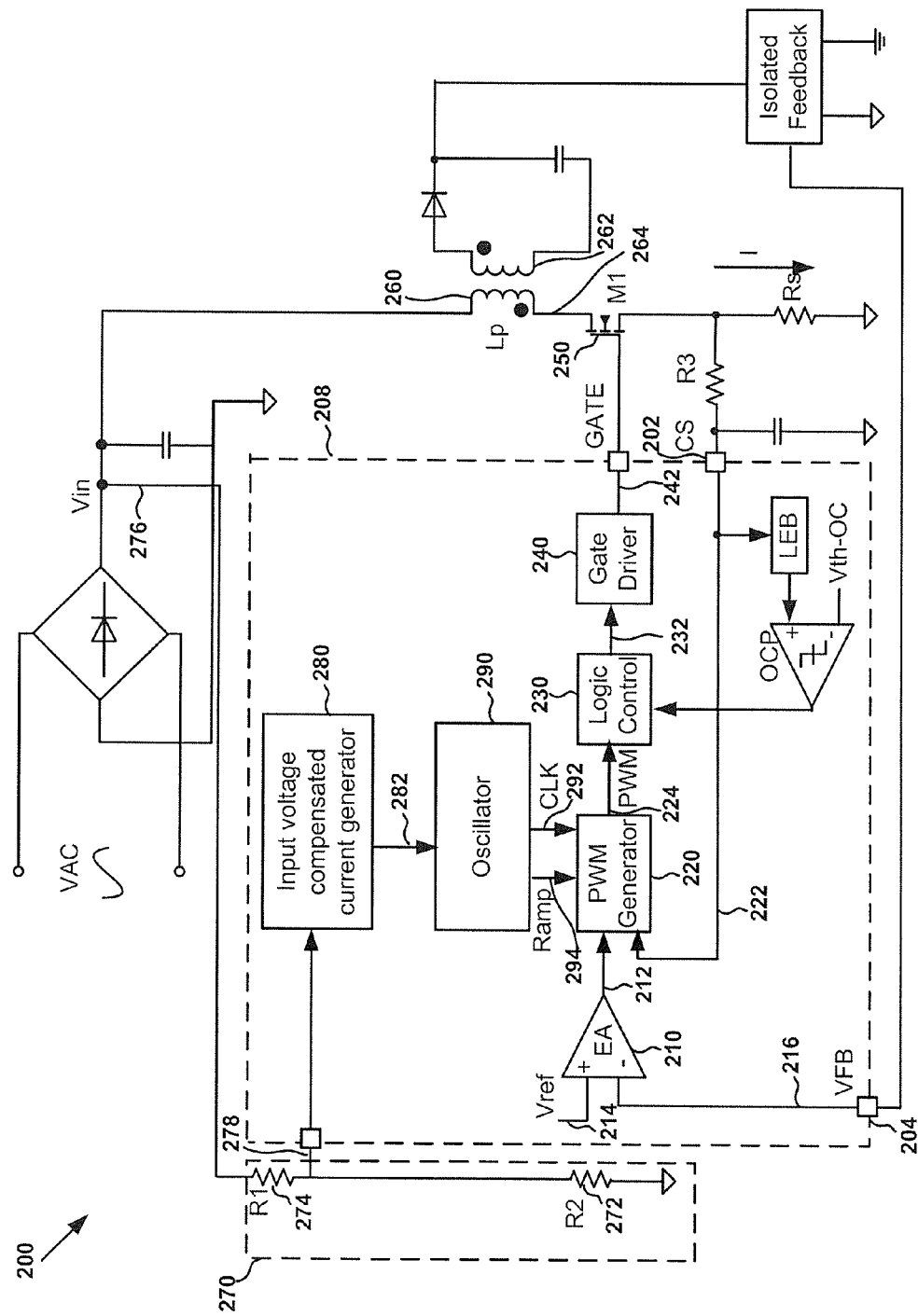
FIG. 3 is a simplified diagram showing a switching-mode power conversion system with input-voltage-compensated switching frequency according to one embodiment of the present invention.

FIG. 3 is a simplified diagram showing a switching-mode power conversion system with input-voltage-compensated switching frequency according to one embodiment of the present invention. This diagram is merely an example, which should not unduly limit the scope of the claims. One of ordinary skill in the art would recognize many variations, alternatives, and modifications. The switching-mode power conversion system 200 includes an error amplifier 210, a PWM generator 220, a logic control component 230, a gate driver 240, a switch 250, a primary winding 260, a secondary winding 262, an input-voltage sensing component 270, an input-voltage-compensated current generator 280, and an oscillator 290. In one embodiment, the input-voltage sensing component 270 includes resistors 272 and 274. In another embodiment, the components 210, 220, 230, 240, 280 and 290 are located on a chip 208. For example, the chip 208 includes at least terminals 202 and 204.

The input-voltage sensing component 270 receives an input voltage 276, represented by $V_{in}$. For example, the input voltage 276 is the rectified line voltage. In another example, the input voltage 276 is received by the primary winding 260. In response, the input-voltage sensing component 270 generates a detected voltage 278 according to an embodiment. For example, the detected voltage 278 is received by the input-voltage compensated current generator 280. In another example, the current generator 280 processes information associated with the detected voltage 278 and outputs one or more reference currents 282 based on at least information associated with the detected voltage 278.

As shown in FIG. 3, the one or more reference currents 282 are received by the oscillator 290. For example, the oscillator 290 processes information associated with the one or more reference currents 282 and determines an oscillation frequency based on at least information associated with the one or more reference currents 282. In one embodiment, the oscillator 290 generates a clock signal 292 and a ramp signal 294, both of which are with the oscillation frequency.

The clock signal 292 and the ramp signal 294 are fed into the PWM generator 220. The PWM generator 220 also receives an amplified signal 212 from the error amplifier 210 and a current-sensing signal 222 from the terminal 202 (i.e., the terminal CS). As shown in FIG. 3, the error amplifier 210 receives a reference voltage 214 represented by $V_{ref}$ and a voltage-feedback signal 216 from the terminal 204 (i.e., the terminal VFB), and in response, sends the amplified signal 212 to the PWM generator 220.

In one embodiment, the PWM generator 220 processes information associated with the signals 292, 294, 212 and 222, and generates a PWM signal 224, which is received by the logic control component 230. For example, the PWM signal 224 has a switching frequency equal to the oscillation frequency of the clock signal 292 and the ramp signal 294.

In another example, the logic control component 230 outputs a control signal 232 to the gate driver 240. The gate drier 240 sends a drive signal 242 to the switch 250 according to an embodiment. In response, according to another embodiment, the switch 250 is turned on or off in order to control a current 264 that flows through the primary winding 260.

Figure 1:
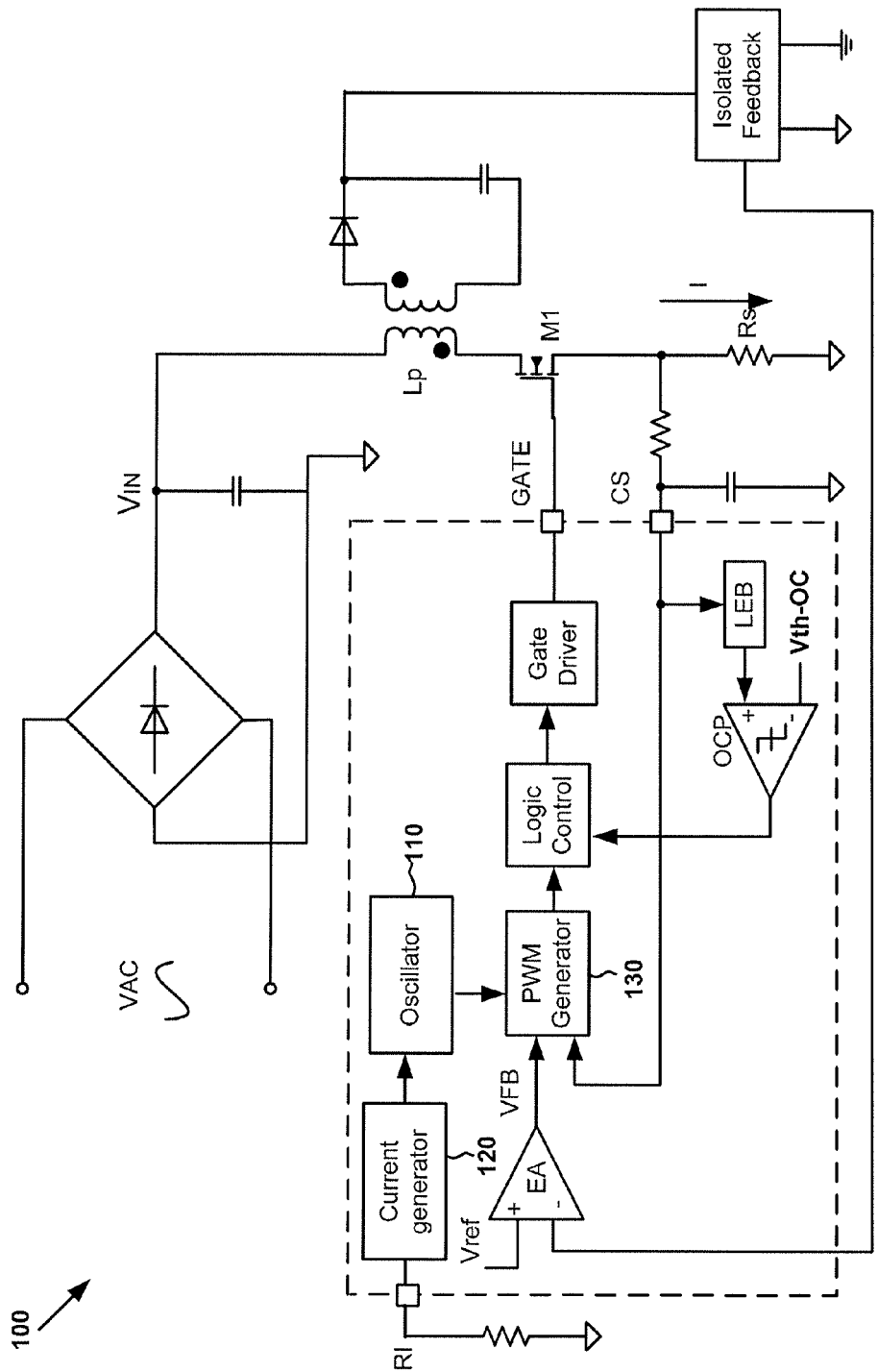
FIG. 1 is a simplified diagram showing a conventional flyback switching-mode power conversion system with fixed switching frequency.
Figure 2:
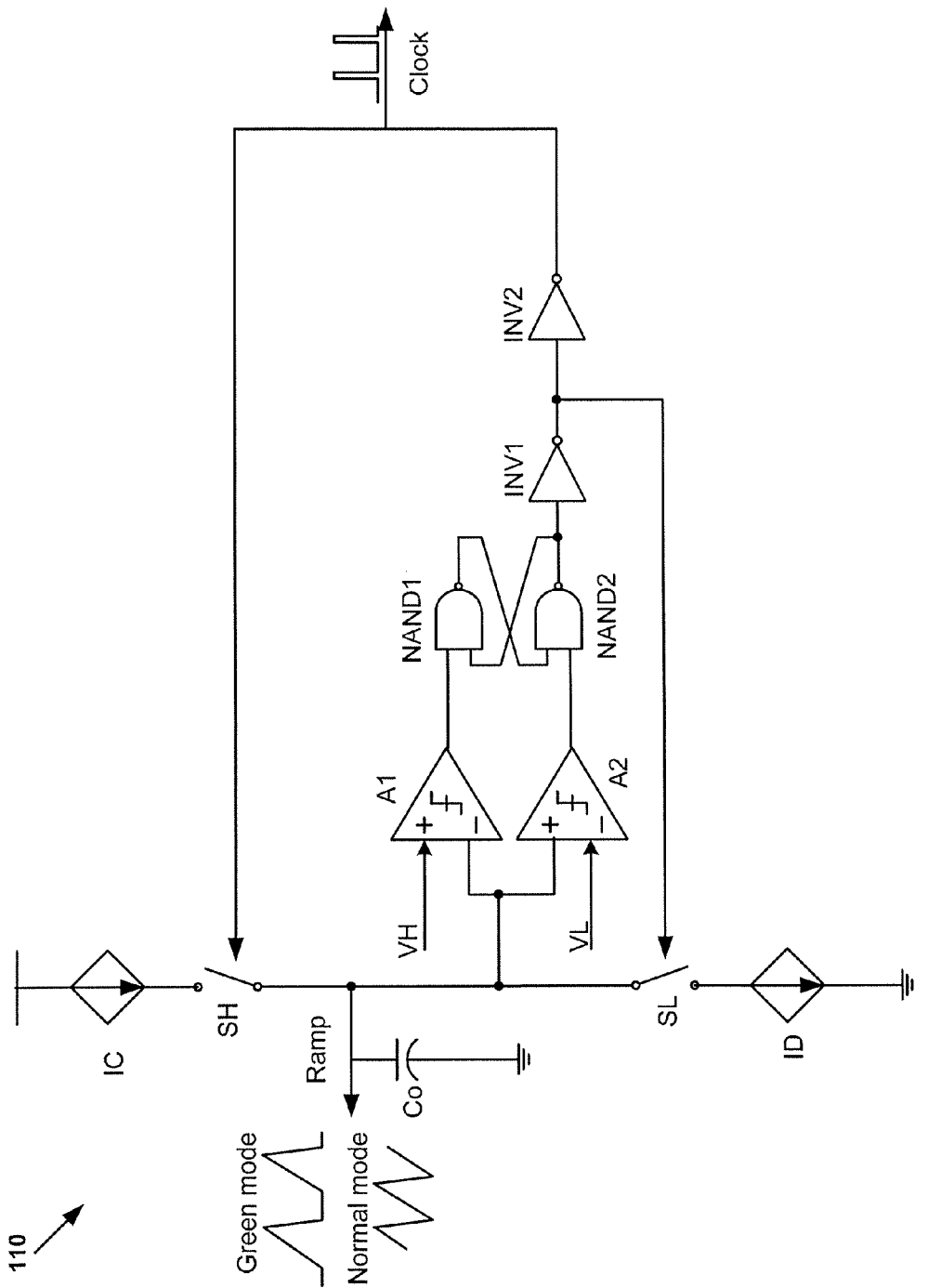
FIG. 2 is a simplified diagram showing the conventional oscillator in the conventional power conversion system.

Referring back to FIG. 1, in the conventional power conversion system 100, the output waveforms for the oscillator 110 is independent of the input voltage $V_{IN}$, which is the rectified line voltage and received by the primary winding. Therefore, the switching frequency for the conventional system 100 is constant regardless of the input voltage.

Returning to FIG. 3, the oscillation frequency of the clock signal 292 and the ramp signal 294 varies with the input voltage V. FIGS. 4(A) and (B) are simplified diagrams showing waveforms of the clock signal 292 and the ramp signal 294 for the switching-mode power conversion system 200 with input-voltage-compensated switching frequency according to certain embodiments of the present invention. These diagrams are merely examples, which should not unduly limit the scope of the claims. One of ordinary skill in the art would recognize many variations, alternatives, and modifications.

As shown in FIG. 4(A), waveforms 310 and 320 represent the ramp signal 294 and the clock signal 292 respectively, each as a function of time, at a first voltage level for $V_{in}$. As shown in FIG. 4(B), waveforms 315 and 325 represent the ramp signal 294 and the clock signal 292 respectively, each as a function of time, at a second voltage level for $V_{in}$. In one embodiment, the first voltage level is lower than the second voltage level.

FIG. 5 is a simplified diagram showing the switching frequency as a function of input voltage $V_{in}$ for the switching-mode power conversion system 200 according to an embodiment of the present invention. This diagram is merely an example, which should not unduly limit the scope of the claims. One of ordinary skill in the art would recognize many variations, alternatives, and modifications. In one embodiment, the switching frequency $f_{SW}$ of the switching signal 224 decreases with the increasing input voltage $V_{in}$. For example, $f_{SW}$ decreases with increasing $V_{in}$ linearly.

FIG. 6 is a simplified diagram showing a combination of the input-voltage-compensated current generator 280 and the oscillator 290 in the switching-mode power conversion system 200 according to an embodiment of the present invention. This diagram is merely an example, which should not unduly limit the scope of the claims. One of ordinary skill in the art would recognize many variations, alternatives, and modifications. The combination 700 of the current generator 280 and the oscillator 290 includes current sources 710 and 715, a capacitor 720, comparators 730 and 735, NAND gates 740 and 745, inverters 750 and 755, switches 760 and 765, and an input-voltage-compensated controller 770.

In one embodiment, the input-voltage-compensated controller 770 receives the detected voltage 278, processes information associated with the detected voltage 278, and outputs control signals 772 and 774 to the current sources 710 and 715 respectively. For example, the current source 710 generates a charge current $I_C$ based on at least information associated with the control signal 772. In another example, the current source 715 generates a discharge current $I_D$ based on at least information associated with the control signal 774.

As shown in FIG. 6, the currents $I_C$ and $I_D$ alternatively charges or discharges the capacitor 720 with capacitance $C_0$ through the switches 760 and 765 according to an embodiment. For example, the switch 760 is controlled by the clock signal 292 that is generated by the inverter 755. In another example, the switch 765 is controlled by a signal 768 generated by the inverter 750.

In one embodiment, the NAND gates 740 and 745 form a RS flip-flop for latching switching states. In another embodiment, the comparators 730 and 735 perform voltage clamping functions. For example, the comparator 730 receives a reference voltage $V_H$ and the ramping signal 294. In yet another example, the comparator 735 receives a reference voltage $V_L$ and the ramping signal 294.

FIG. 7 is a simplified diagram showing a combination of the input-voltage sensing component 270, the input-voltage-compensated controller 770, and the current sources 710 and 715 in the switching-mode power conversion system 200 according to an embodiment of the present invention. This diagram is merely an example, which should not unduly limit the scope of the claims. One of ordinary skill in the art would recognize many variations, alternatives, and modifications. The combination 800 of the sensing component 270, the controller 770, and the current sources 710 and 715 includes transistors 810, 820, 830, 840, 850 and 860, a comparator 870, and the resistors 274 and 278.

In one embodiment, the input-voltage sensing component 270 includes the resistors 272 and 274. In another embodiment, the input-voltage sensing component 270 receives the input voltage 276, and in response generates the detected voltage 278. The detected voltage 278 is, for example, received by the comparator 870 and the transistor 810. The comparator 870 also receives a reference voltage 872 represented by $V_{REF}$.

As shown in FIG. 7, the detected voltage 278 is regulated to be $V_{REF}$. Hence, a current 812 that flows from a node 874 to a node 876 is $$I_0 = \frac{V_{REF}}{R_2} - \frac{V_{in} - V_{REF}}{R_1} \tag{8}$$

where $I_0$ represents the magnitude of the current 812, and $R_1$ and $R_2$ represent resistance of the resistors 274 and 272, respectively. Thus, a current 822 that flows from the transistor 820 to the transistor 810 is $$I_1 = \left(\frac{V_{REF}}{R_2} - \frac{V_{in} - V_{REF}}{R_1}\right) \tag{9}$$

where $I_1$ represents the current 812. As shown in FIG. 7, the current 822 is mirrored to generate the charge current $I_C$ by a current mirror that includes the transistors 820 and 840. For example, the transistors 820 and 840 are matched. In another example, the charge current $I_C$ is $$I_C = \alpha \cdot \left(\frac{V_{REF}}{R_2} - \frac{V_{in} - V_{REF}}{R_1}\right) \tag{10}$$

where α is a coefficient that is determined by the current mirror ratio.

Additionally, the current 822 is mirrored to generate a current 832 by a current mirror that includes the transistors 820 and 830. For example, the current 822 is represented by $I_2$. In another example, the current 832 flows from the transistor 830 to the transistor 850. Furthermore, the current 832 is mirrored to generate the discharge current $I_D$ by a current mirror that includes the transistors 850 and 860. For example, the discharge current $I_D$ is $$I_D = \beta \cdot \left(\frac{V_{REF}}{R_2} - \frac{V_{in} - V_{REF}}{R_1}\right) \tag{11}$$

where β is a coefficient that is determined by the ratios of the two current mirrors, one of which includes the transistors 820 and 830, and the other of which includes the transistors 850 and 860. As shown in FIG. 6, the currents $I_C$ and $I_D$ alternatively charges or discharges the capacitor 720 with capacitance $C_0$ through the switches 760 and 765 according to an embodiment.

Referring to FIGS. 3, 6 and 7, the switching frequency $F_{sw}$ for the system 200 is modulated by the input voltage $V_{in}$ as follows:

$$f_{Sw} = \frac{\left(\frac{V_{REF}}{R_2} - \frac{V_{in}}{R_1}\right)}{(V_H - V_L) \cdot C_O \cdot \left(\frac{1}{\alpha} + \frac{1}{\beta}\right)} \tag{12}$$

FIG. 8 is a simplified diagram showing a switching-mode power conversion system with input-voltage-compensated switching frequency according to another embodiment of the present invention. This diagram is merely an example, which should not unduly limit the scope of the claims. One of ordinary skill in the art would recognize many variations, alternatives, and modifications. The switching-mode power conversion system 900 includes an error amplifier 910, a PWM generator 920, a logic control component 930, a gate driver 940, a switch 950, a primary winding 960, a secondary winding 962, an input-voltage sensing component 970, an input-voltage-compensated current generator 980, a constant current generator 985, an oscillator 290, and resistors 972 and 974. In one embodiment, the components 910, 920, 930, 940, 970, 980, 985 and 990 are located on a chip 908. For example, the chip 908 includes at least terminals 902 and 204. In another embodiment, the input-voltage sensing component 970 is not on the chip 908.

The input-voltage sensing component 970, through the resistor 974, receives an input voltage 976, represented by $V_{in}$. For example, the input voltage 976 is the rectified line voltage. In another example, the input voltage 976 is received by the primary winding 960. In response, the input-voltage sensing component 970 generates a detected signal 978 according to an embodiment. For example, the detected signal 978 is a detected voltage. In another example, the detected signal 978 is a detected current. In yet another example, the detected signal 978 is received by the input-voltage compensated current generator 980. In yet another example, the current generator 980 processes information associated with the detected signal 978 and outputs one or more reference currents 982 based on at least information associated with the detected signal 978. In addition, the constant current generator 985 is biased to the ground voltage through the resistor 972, and generates one or more constant currents 988 according to an embodiment.

As shown in FIG. 8, the one or more reference currents 982 and the one or more constant currents 988 are received by the oscillator 990. For example, the oscillator 990 processes information associated with the one or more reference currents 982 and the one or more constant currents 988, and determines an oscillation frequency based on at least information associated with the one or more reference currents 982 and the one or more constant currents 988. In one embodiment, the oscillator 990 generates a clock signal 992 and a ramp signal 994, both of which are with the oscillation frequency.

The clock signal 992 and the ramp signal 994 are fed into the PWM generator 920. The PWM generator 920 also receives an amplified signal 912 from the error amplifier 910 and a current-sensing signal 922 from the terminal 902 (i.e., the terminal CS). As shown in FIG. 8, the error amplifier 910 receives a reference voltage 914 represented by $V_{ref}$, and a voltage-feedback signal 916 from the terminal 904 (i.e., the terminal VFB), and in response, sends the amplified signal 912 to the PWM generator 920.

In one embodiment, the PWM generator 920 processes information associated with the signals 992, 994, 912 and 922, and generates a PWM signal 924, which is received by the logic control component 930. For example, the PWM signal 924 has a switching frequency equal to the oscillation frequency of the clock signal 992 and the ramp signal 994.

In another example, the logic control component 930 outputs a control signal 932 to the gate driver 940. The gate drier 940 sends a drive signal 942 to the switch 950 according to an embodiment. In response, according to another embodiment, the switch 950 is turned on or off in order to control a current 964 that flows through the primary winding 960. As shown in FIG. 3, the oscillation frequency of the clock signal 992 and the ramp signal 994 varies with the input voltage $V_{in}$.

FIG. 9 is a simplified diagram showing a combination of the input-voltage-compensated current generator 980, the constant current generator 985, and the oscillator 990 in the switching-mode power conversion system 900 according to an embodiment of the present invention. This diagram is merely an example, which should not unduly limit the scope of the claims. One of ordinary skill in the art would recognize many variations, alternatives, and modifications. The combination 1000 of the current generators 980 and 985 and the oscillator 990 includes current sources 1010, 1015, 1020 and 1025, a capacitor 1020, comparators 1030 and 1035, NAND gates 1040 and 1045, inverters 1050 and 1055, switches 1060 and 1065, and an input-voltage-compensated controller 1070.

In one embodiment, the input-voltage-compensated controller 1070 receives the detected signal 978, processes information associated with the detected signal 978, and outputs control signals 1072 and 1074 to the current sources 1010 and 1020 respectively. For example, the current source 1010 generates a current $I_{C1}$ based on at least information associated with the control signal 1072. In another example, the current source 1020 generates a current $I_{D1}$ based on at least information associated with the control signal 1074. Additionally, the current sources 1015 and 1025 generate currents $I_C$ and $I_D$ respectively, according to an embodiment.

As shown in FIG. 9, the combination of the currents $I_C$ and $I_{C1}$ serves as a charge current for the capacitor 1020, and the combination of the currents $I_D$ and $I_{D1}$ as a discharge current for the capacitor 1020. For example, the charge current and the discharge current alternatively charges or discharges the capacitor 1020 with capacitance $C_0$ through the switches 1060 and 1065 according to an embodiment. For example, the switch 1060 is controlled by the clock signal 992 that is generated by the inverter 1055. In another example, the switch 1065 is controlled by a signal 1068 generated by the inverter 1050.

In one embodiment, the NAND gates 1040 and 1045 form a RS flip-flop for latching switching states. In another embodiment, the comparators 1030 and 1035 perform voltage clamping functions. For example, the comparator 1030 receives a reference voltage $V_H$ and the ramping signal 994. In yet another example, the comparator 1035 receives a reference voltage $V_L$ and the ramping signal 994.

According to another embodiment of the present invention, a switching-mode power conversion system includes a primary winding configured to receive an input voltage and a secondary winding coupled to the primary winding. Additionally, the system includes a compensation component configured to receive the input voltage and generate at least a clock signal based on at least information associated with the input voltage, and a signal generator configured to receive at least the clock signal and generate at least a control signal based on at least information associated with the clock signal. Moreover, the system includes a gate driver configured to receive at least the control signal and generate a drive signal based on at least information associated with the control signal, and a first switch configured to receive the drive signal and affect a first current flowing through the primary winding. The drive signal is associated with a switching frequency, and the switching frequency varies with the input voltage in magnitude. For example, the system is implemented according to at least FIG. 3, FIG. 6, and/or FIG. 7. In another example, the system is implemented according to at least FIG. 8 and/or FIG. 9.

In yet another example, the switching frequency decreases with the increasing input voltage in magnitude. In yet another example, the input voltage is a rectified line voltage. In yet another example, the compensation component includes at least a voltage sensing component and a current generator. The voltage sensing component is configured to receive the input voltage and generate a detected voltage based on at least information associated with the input voltage, and the current generator is configured to receive the detected voltage and generate at least a second current based on at least information associated with the detected voltage corresponding to a detected voltage magnitude, the second current corresponding to a first current magnitude. The first current magnitude varies with the detected voltage magnitude.

In yet another example, the voltage sensing component includes a first resistor and a second resistor. The first resistor is associated with a first terminal and a second terminal, and the second resistor associated with a third terminal and a fourth terminal. The first terminal is biased to the input voltage, and the second terminal and the third terminal are coupled together at a node associated with the detected voltage. In yet another example, the current generator is further configured to generate a third current based on at least information associated with the detected voltage. The third current corresponds to a second current magnitude, and the second current magnitude varies with the detected voltage magnitude. In yet another example, the second current decreases with the increasing input voltage in magnitude, and the third current decreases with the increasing input voltage in magnitude. In yet another example, the compensation component further includes an oscillator configured to receive at least the second current and generate at least the clock signal based on at least information associated with the second current. The clock signal corresponds to an oscillation frequency, and the oscillation frequency varies with the input voltage in magnitude. In yet another example, the switching frequency is equal to the oscillation frequency in magnitude. In yet another example, the compensation component is further configured to generate a ramping signal, and the signal generator is further configured to receive the ramping signal corresponding to the oscillation frequency.

According to yet another embodiment of the present invention, a switching-mode power conversion system includes a primary winding configured to receive an input voltage, and a secondary winding coupled to the primary winding. Additionally, the system includes a compensation component including a voltage sensing component, a current generator and an oscillator, and the oscillator is coupled to the current generator. The compensation component is configured to receive the input voltage and generate at least a clock signal based on at least information associated with the input voltage. Moreover, the system includes a signal generator configured to receive at least the clock signal and generate at least a control signal based on at least information associated with the clock signal, and a gate driver configured to receive at least the control signal and generate a drive signal based on at least information associated with the control signal. Also, the system includes a first switch configured to receive the drive signal and affect a first current flowing through the primary winding. The voltage sensing component is configured to receive the input voltage and generate a detected voltage based on at least information associated with the input voltage, and the current generator is configured to receive the detected voltage and generate a second current and a third current based on at least information associated with the detected voltage. Each of the second current and the third current varies with the input voltage in magnitude. Also, the control signal is associated with a switching frequency, and the switching frequency decreases with the increasing input voltage in magnitude. For example, the system is implemented according to at least FIG. 3, FIG. 6, and/or FIG. 7. In another example, the system is implemented according to at least FIG. 8 and/or FIG. 9.

In another example, the oscillator includes at least a capacitor, a second switch, and a third switch. The second current is a charge current for the capacitor if the second switch is closed and the third switch is open, and the third current is a discharge current for the capacitor if the second switch is open and the third switch is closed. In yet another example, the voltage sensing component includes a first resistor and a second resistor. The first resistor is associated with a first terminal and a second terminal, and the second resistor is associated with a third terminal and a fourth terminal. The first terminal is biased to the input voltage, and the second terminal and the third terminal are coupled together at a node associated with the detected voltage. In yet another example, the second current decreases with the increasing input voltage in magnitude, and the third current decreases with the increasing input voltage in magnitude. In yet another example, the oscillator is configured to receive the second current and the third current and generate the clock signal and a ramping signal based on at least information associated with the second current and the third current. Both the clock signal and the ramping signal correspond to an oscillation frequency, and the oscillation frequency varies with the input voltage in magnitude.

According to yet another embodiment of the present invention, a method for regulating a switching frequency for a switching-mode power conversion system includes receiving an input voltage by a primary winding and by a compensation component. The compensation component includes a voltage sensing component, a current generator and an oscillator, the oscillator coupled to the current generator. Additionally, the method includes generating at least a clock signal based on at least information associated with the input voltage, receiving at least the clock signal by a signal generator, generating at least a control signal based on at least information associated with the clock signal, and receiving at least the control signal by a gate driver. Moreover, the method includes generating a drive signal based on at least information associated with the control signal, receiving the drive signal by a first switch, and affecting a first current flowing through the primary winding. The process for generating at least a clock signal includes receiving the input voltage by the voltage sensing component, generating a detected voltage based on at least information associated with the input voltage, receiving the detected voltage by the current generator, and generating a second current and a third current based on at least information associated with the detected voltage. Also, each of the second current and the third current varies with the input voltage in magnitude. The control signal is associated with a switching frequency, and the switching frequency decreases with the increasing input voltage in magnitude. For example, the method is implemented according to at least FIG. 3, FIG. 6, and/or FIG. 7. In another example, the system is implemented according to at least FIG. 8 and/or FIG. 9.

In another example, the process for generating at least a clock signal further includes receiving the second current and the third current by the oscillator, and generating at least the clock signal based on at least infoimation associated with the second current and the third current. The clock signal corresponds to an oscillation frequency, and the oscillation frequency varies with the input voltage in magnitude. In yet another example, the process for generating at least the clock signal based on at least information associated with the second current and the third current includes charging a capacitor by the second current if a second switch is closed and a third switch is open, and discharging the capacitor by the third current if the second switch is open and the third switch is closed. The oscillator includes at least the capacitor, the second switch, and the third switch. In yet another example, the second current decreases with the increasing input voltage in magnitude, and the third current decreases with the increasing input voltage in magnitude. In yet another example, the detected voltage is proportional with the input voltage in magnitude.

Many benefits are achieved by way of the present invention over conventional techniques. Certain embodiments of the present invention provide adaptive line-voltage compensated switching frequency control. Some embodiments of the present invention use the line voltage to modulate the switching frequency. For example, a high line voltage results in low switching frequency, and a low line voltage results in high switching frequency. Certain embodiments of the present invention provide switching frequency control methods to reduce power loss in switching-mode power conversion systems including but not limited to off-line power supplies. Some embodiments of the present invention can improve conversion efficiency for both low and high line voltages.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
a compensation component configured to receive an input voltage and generate a clock signal based on at least information associated with the input voltage;
a signal generator configured to receive the clock signal and generate a control signal based on at least information associated with the clock signal; and a gate driver configured to receive the control signal and output a drive signal to a switch based on at least information associated with the control signal in order to affect a first current flowing through a primary winding of the power conversion system, the drive signal being associated with a switching frequency;

wherein:
the compensation component includes a current generator configured to receive a detected voltage associated with the input voltage and generate a second current based on at least information associated with the detected voltage corresponding to a detected voltage magnitude;
the current generator is further configured to generate a third current based on at least information associated with the detected voltage, the third current corresponding to a current magnitude; and
the current magnitude varies with the detected voltage magnitude.

2. The system controller of claim 1 wherein the compensation component and the signal generator are further configured to cause the switching frequency to decrease with the increasing input voltage in magnitude.

3. The system controller of claim 1 wherein the input voltage is a rectified line voltage.

4. The system controller of claim 1 wherein the compensation component further includes a voltage sensing component configured to receive the input voltage and generate the detected voltage based on at least information associated with the input voltage.

5. The system controller of claim 4 wherein:
the voltage sensing component includes a first resistor and a second resistor, the first resistor associated with a first terminal and a second terminal, the second resistor associated with a third terminal and a fourth terminal;
the first terminal is biased to the input voltage; and
the second terminal and the third terminal are coupled together at a node associated with the detected voltage.

6. The system controller of claim 1 wherein the current generator is further configured to cause the second current and the third current to decrease with the increasing input voltage in magnitude.

7. The system controller of claim 1 wherein:
the compensation component further includes an oscillator configured to receive the second current and generate the clock signal based on at least information associated with the second current, the clock signal corresponding to an oscillation frequency; and
the compensation component is further configured to cause the oscillation frequency to vary with the input voltage in magnitude.

8. The system controller of claim 7 wherein the switching frequency is equal to the oscillation frequency in magnitude.

9. The system controller of claim 7 wherein:
the compensation component is further configured to generate a ramping signal; and
the signal generator is further configured to receive the ramping signal corresponding to the oscillation frequency.

10. The system controller of claim 9 wherein the oscillator is further configured to generate the ramping signal.

11. A system controller for regulating a power conversion system, the system controller comprising:
a compensation component including a current generator, the compensation component being configured to receive an input voltage and generate a clock signal based on at least information associated with the input voltage;
a signal generator configured to receive the clock signal and generate a control signal based on at least information associated with the clock signal; and
a gate driver configured to receive the control signal and output a drive signal to a first switch based on at least information associated with the control signal in order to affect a first current flowing through a primary winding of the power conversion system;
wherein the current generator is configured to receive a detected voltage associated with the input voltage and generate a second current and a third current based on at least information associated with the detected voltage, each of the second current and the third current varying with the input voltage in magnitude.

12. The system controller of claim 11 wherein:
the control signal is associated with a switching frequency; and
the compensation component and the signal generator are further configured to cause the switching frequency to decrease with the increasing input voltage in magnitude.

13. The system controller of claim 11 wherein the current generator is further configured to cause the second current and the third current to decrease with the increasing input voltage in magnitude.

14. The system controller of claim 11 wherein the compensation component further includes a voltage sensing component configured to receive the input voltage and generate the detected voltage based on at least information associated with the input voltage.

15. The system controller of claim 14 wherein:
the voltage sensing component includes a first resistor and a second resistor, the first resistor associated with a first terminal and a second terminal, the second resistor associated with a third terminal and a fourth terminal;
the first terminal is biased to the input voltage; and
the second terminal and the third terminal are coupled together at a node associated with the detected voltage.

16. The system controller of claim 14 wherein the compensation component further includes an oscillator coupled to the current generator.

17. The system controller of claim 16 wherein:
the oscillator includes at least a capacitor, a second switch, and a third switch;
the second current is a charge current for the capacitor if the second switch is closed and the third switch is open; and
the third current is a discharge current for the capacitor if the second switch is open and the third switch is closed.

18. The system controller of claim 16 wherein the oscillator is configured to receive the second current and the third current and generate the clock signal and a ramping signal based on at least information associated with the second current and the third current, both the clock signal and the ramping signal corresponding to an oscillation frequency, the oscillation frequency varying with the input voltage in magnitude.

19. A method for regulating a power conversion system, the method comprising:
receiving an input voltage;
generating a clock signal based on at least information associated with the input voltage;
receiving the clock signal;
generating a control signal based on at least information associated with the clock signal;
receiving the control signal;

generating a drive signal based on at least information associated with the control signal, the drive signal being associated with a switching frequency;

receiving the drive signal; and affecting a first current flowing through a primary winding of a power conversion system;

wherein the process for generating a clock signal includes:
  receiving the input voltage;
  generating a detected voltage based on at least information associated with the input voltage;
  receiving the detected voltage; and
  generating a second current and a third current based on at least information associated with the detected voltage corresponding to a detected voltage magnitude.

20. The method of claim 19 wherein:
the third current corresponds to a current magnitude; and
the current magnitude varies with the detected voltage magnitude.

21. The method of claim 19, and further comprising causing the switching frequency to decrease with the increasing input voltage in magnitude.

22. The method of claim 19 wherein the process for generating a clock signal based on at least information associated with the input voltage further includes:
  receiving the second current and the third current; and
  causing the second current and the third current to decrease with the increasing input voltage in magnitude.

23. The method of claim 19 wherein the process for generating a clock signal based on at least information associated with the input voltage further includes:
  receiving the second current;
  generating the clock signal based on at least information associated with the second current, the clock signal corresponding to an oscillation frequency; and
  causing the oscillation frequency to vary with the input voltage in magnitude.

24. The method of claim 23, and further comprising generating a ramping signal corresponding to the oscillation frequency.

25. A method for regulating a power conversion system, the method comprising:
  receiving an input voltage;
  generating a clock signal based on at least information associated with the input voltage;
  receiving the clock signal;
  generating a control signal based on at least information associated with the clock signal;
  receiving the control signal;
  generating a drive signal based on at least information associated with the control signal;
  receiving the drive signal; and
  affecting a first current flowing through a primary winding of a power conversion system;
  wherein the process for generating a clock signal based on at least information associated with the input voltage includes:
    receiving a detected voltage associated with the input voltage; and
    generating a second current and a third current based on at least information associated with the detected voltage;
    wherein each of the second current and the third current varies with the input voltage in magnitude.

26. The method of claim 25 wherein the process for generating a clock signal further includes:
  receiving the second current and the third current; and
  generating the clock signal based on at least information associated with the second current and the third current;
  wherein:
    the clock signal corresponds to an oscillation frequency; and
    the oscillation frequency varies with the input voltage in magnitude.

27. The method of claim 26 wherein the process for generating the clock signal based on at least information associated with the second current and the third current includes:
  charging a capacitor by the second current if a second switch is closed and a third switch is open; and
  discharging the capacitor by the third current if the second switch is open and the third switch is closed.

28. The method of claim 25 wherein:
the second current decreases with the increasing input voltage in magnitude; and
the third current decreases with the increasing input voltage in magnitude.

29. The method of claim 25 wherein the detected voltage is proportional with the input voltage in magnitude.

* * * * *